United States Patent Office 3,262,958
Patented July 26, 1966

3,262,958
MAGNESIUM BIS-(VINYL ALUMINUM TRIHYDRIDE)
James M. Riddle, Baton Rouge, La., assignor to Ethyl Corporation, New York, N.Y., a corporation of Virginia
No Drawing. Filed June 22, 1964, Ser. No. 378,483
2 Claims. (Cl. 260—448)

This invention relates to a novel compound and its production. More particularly it relates to magnesium bis-(vinyl aluminum trihydride) and a novel process by which this material can be synthesized.

Magnesium bis-(vinyl aluminum trihydride) has the formula $Mg[Al(CH=CH_2)H_3]_2$. It generally exists as a yellow waxy substance and has appreciable solubility in certain inert, anhydrous organic solvents such as ethers. On exposure to moisture and other reactive substances, magnesium bis-(vinyl aluminum trihydride) evolves gaseous hydrogen and thus is useful as a convenient source of hydrogen. It is also a powerful reducing agent and can be used as an ingredient in the formation of Ziegler catalysts for olefin polymerization such as in the formation of polyethylene, polypropylene and related polymeric materials.

To prepare this novel compound, vinyl magnesium chloride dissolved in a suitable ether such as tetrahydrofuran is added to sodium aluminum hydride which is also dissolved in a suitable ether such as tetrahydrofuran. This reaction is preferably conducted under ambient temperature and pressure conditions (e.g., room temperature, atmospheric pressure) and under anhydrous conditions. Reaction proceeds readily although there is a tendency for emulsion formation to occur. Addition of paraffinic hydrocarbon (e.g., petroleum ether, heptane, etc.) results in breaking the emulsion leaving an organic phase in which the magnesium bis-(vinyl aluminum trihydride) product is dissolved. This organic phase is separated from the precipitates which form and is then evaporated (preferably at reduced pressure and room temperature) so as to provide the product of this invention in essentially pure, isolated form.

The relative proportions of vinyl magnesium chloride and sodium aluminum hydride are not critical although, generally speaking, best results are achieved when they are employed in approximately equal molar quantities.

In an actual experiment utilizing the foregoing procedure, a solution of 6.0 grams of sodium aluminum hydride in 200 ml. of tetrahydrofuran was added to a solution of 9.0 grams of vinyl magnesium chloride dissolved in 80 ml. of tetrahydrofuran. The resultant magnesium bis-(vinyl aluminum trihydride) was isolated in the form of a tetrahydrofuranate which, on analysis, was found to correspond to the formula $$Mg[Al(CH=CH_2)H_3]_2 \cdot 4C_4H_4O$$

Methods for preparing the reactants used in the process of this invention are reported in the literature. Thus, the vinyl magnesium chloride may be made by the usual procedure for Grignard reagents, a small amount of an alkyl bromide being present as initiator. Similarly, the procedure described by Finholt, Bond and Schlesinger, J. Am. Chem. Soc., 69, 1199 (1947), may be used to produce sodium aluminum tetrahydride.

What is claimed is:
1. Magnesium bis-(vinyl aluminum trihydride).
2. A process for the production of magnesium bis-(vinyl aluminum trihydride) which comprises introducing a solution of sodium aluminum hydride in tetrahydrofuran into a solution of vinyl magnesium chloride in tetrahydrofuran and isolating the magnesium bis-(vinyl aluminum trihydride) from the resultant system.

No references cited.

TOBIAS E. LEVOW, Primary Examiner.
CARL D. QUARFORTH, Examiner.
L. A. SEBASTIAN, Assistant Examiner.